(12) United States Patent
Chin

(10) Patent No.: US 10,160,292 B2
(45) Date of Patent: Dec. 25, 2018

(54) UNDERBODY COVER ASSEMBLY

(71) Applicant: Honda Motor Co., Ltd., Tokyo (JP)

(72) Inventor: Walter Z. Chin, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 15/434,945

(22) Filed: Feb. 16, 2017

(65) Prior Publication Data
US 2018/0229776 A1    Aug. 16, 2018

(51) Int. Cl.
*B60H 1/24* (2006.01)
*B60H 1/26* (2006.01)

(52) U.S. Cl.
CPC ............ *B60H 1/248* (2013.01); *B60H 1/249* (2013.01); *B60H 1/26* (2013.01)

(58) Field of Classification Search
CPC ...... B60H 1/00564; B60H 1/24; B60H 1/241; B60H 1/244; B60H 1/242; B60H 1/243; B60H 1/248; B60H 1/249
USPC ............................................ 296/208; 454/70
See application file for complete search history.

(56) References Cited

U.S. PATENT DOCUMENTS

| | | | |
|---|---|---|---|
| 5,167,573 A * | 12/1992 | Kanno | B60H 1/00428 454/141 |
| 5,823,870 A * | 10/1998 | Emerling | B60H 1/249 454/162 |
| 6,227,500 B1 | 5/2001 | Inaba et al. | |
| 6,396,163 B1 | 5/2002 | Sugiura et al. | |
| 6,409,591 B1 * | 6/2002 | Sullivan | B60H 1/249 137/512.1 |
| 6,508,325 B1 | 1/2003 | Schwarz et al. | |
| 8,690,206 B1 | 4/2014 | Yamasaki et al. | |
| 9,132,791 B2 | 9/2015 | Yamasaki et al. | |
| 9,776,472 B2 * | 10/2017 | Bryant | B60H 1/26 |
| 2008/0076344 A1 * | 3/2008 | Flowerday | B60H 1/249 454/162 |
| 2008/0315050 A1 | 12/2008 | Buckley et al. | |
| 2014/0057543 A1 * | 2/2014 | Kim | B60H 1/249 454/165 |

(Continued)

FOREIGN PATENT DOCUMENTS

| | | |
|---|---|---|
| DE | 10316535 B3 | 1/2005 |
| DE | 102009035734 A1 | 3/2010 |

(Continued)

*Primary Examiner* — Jason S Morrow
(74) *Attorney, Agent, or Firm* — Honda Patents & Technologies North America, LLC; Mark E. Duell

(57) ABSTRACT

An underbody cover assembly includes an upper member for receiving and housing a component that includes a first flange extending around a circumference of the upper member defining a component space. The component is disposable in the component space. The upper member also includes at least one mounting location having a hole for receiving a fastener there through for mounting the upper member to a body member. The underbody cover assembly also includes a lower member connected to the upper member for covering an air outlet that includes a U-shaped second flange extending inwardly around a circumference of the lower member, a screen with a plurality of apertures for blocking debris from entering the air outlet, and a seal disposed on a distal edge of the second flange for providing a seal between the lower member and the body member.

20 Claims, 6 Drawing Sheets

(56) References Cited

U.S. PATENT DOCUMENTS

| | | | |
|---|---|---|---|
| 2014/0111950 A1* | 4/2014 | Yamasaki | B60R 16/0239 |
| | | | 361/747 |
| 2014/0323027 A1* | 10/2014 | Ide | B60H 1/248 |
| | | | 454/119 |
| 2017/0057441 A1* | 3/2017 | Perucca | B60R 19/483 |
| 2018/0215236 A1* | 8/2018 | Carlson | B60H 1/249 |

FOREIGN PATENT DOCUMENTS

| | | |
|---|---|---|
| DE | 102012100497 A1 | 8/2014 |
| JP | 2010210498 A1 | 9/2010 |

* cited by examiner

SECTION A-A

UNDERBODY COVER ASSEMBLY

TECHNICAL FIELD

The embodiments disclosed herein are related to the field of integrated brackets and covers for components in a motor vehicle.

BACKGROUND

In some motor vehicles, an air outlet is located in the rear quarter of the body of the motor vehicle. However, in some instances, noise and vibrations may enter the cabin via the air outlet. Modern vehicles may also include modern electronic measures to aid the driver such as a blind spot indicator ("BSI") sensor located in the rear quarter of the body of the motor vehicle. A cover is necessary to protect the BSI from false readings caused by dirt and snow interference. There is a need to provide an underbody cover assembly to protect the BSI that also prevents noise and vibrations from entering the cabin.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an underbody cover assembly includes an upper member having a first flange extending around a circumference of the upper member defining a component space and at least one mounting location having a hole for receiving a fastener there through, and a lower member connected to the upper member having a second flange extending inwardly around a circumference of the lower member, the lower member having a screen for blocking debris.

According to another aspect, a motor vehicle includes an inner body member, an outer body member disposed on an outer side of the inner body member, an air outlet disposed in the inner body member for allowing air to exit a cabin of the motor vehicle, and an underbody cover assembly disposed between the inner body member and the outer body member. The under body cover assembly includes an upper member having a first flange extending around a circumference of the upper member defining a component space and at least one mounting location having a hole for receiving a fastener there through, and a lower member connected to the upper member having a second flange extending inwardly around a circumference of the lower member, the lower member covering the air outlet and having a screen for blocking debris.

According to yet another aspect, an underbody cover assembly includes an upper member for receiving and housing a component that includes a first flange extending around a circumference of the upper member defining a component space, the component being disposable in the component space and at least one mounting location having a hole for receiving a fastener there through for mounting the upper member to a body member. The underbody cover assembly also includes a lower member connected to the upper member for covering an air outlet that includes a U-shaped second flange extending inwardly around a circumference of the lower member, a screen with a plurality of apertures for blocking debris from entering the air outlet, and a seal disposed on a distal edge of the second flange for providing a seal between the lower member and the body member.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
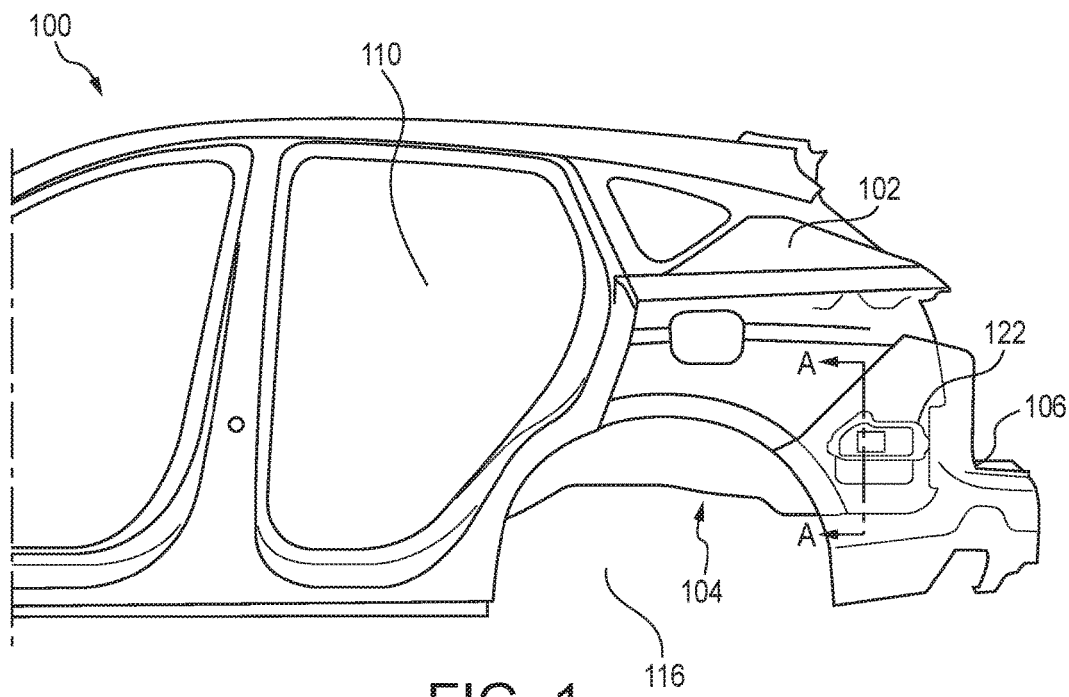
FIG. 1 is side view of a portion of a white body of a motor vehicle.
Figure 2:
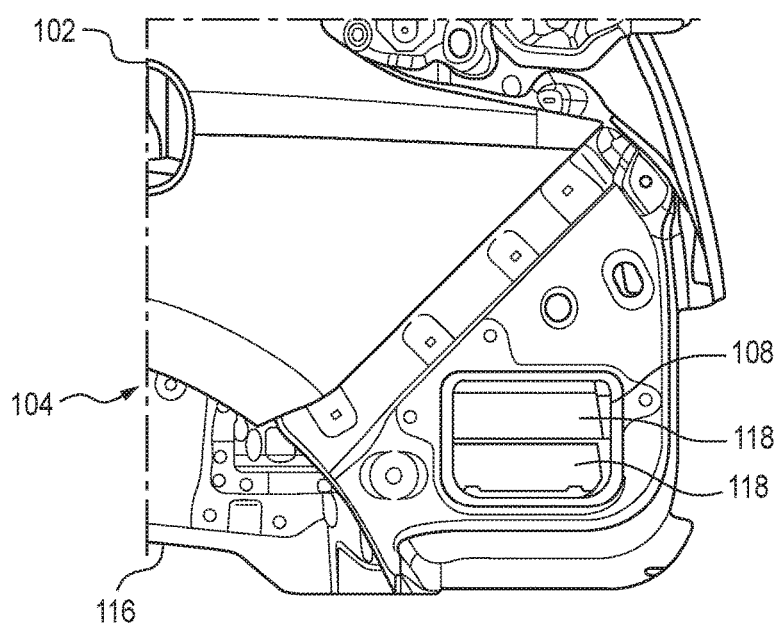
FIG. 2 is a side view of a portion of a rear quarter of the white body of the motor vehicle.
Figure 3:
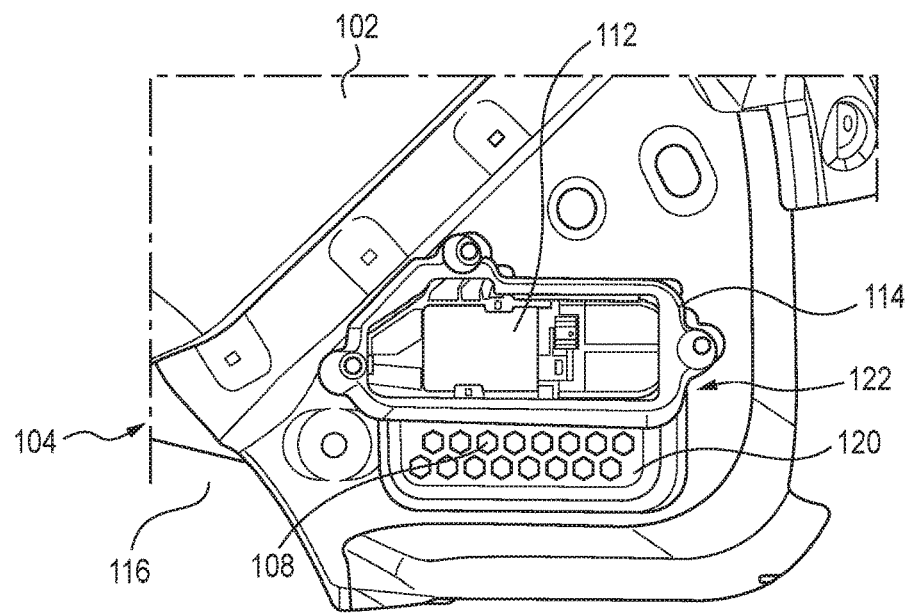
FIG. 3 is a side view of a portion of the rear quarter of the white body of the motor vehicle with an underbody cover assembly.

FIGS. 1-4 illustrate an embodiment of a rear quarter 104 of a portion of a white body 102 of a motor vehicle 100. In the rear quarter 104 of the white body 102, beneath an outer body panel 106 (illustrated transparently for purpose of discussion), such as a rear bumper, an air outlet 108, illustrated in FIG. 2, is positioned to permit circulation of fresh air into the passenger cabin 110 of the motor vehicle 100 and equalization of air pressure between the interior of the passenger cabin 110 and the outside of the motor vehicle 100, such as when a door is closed.

Additionally, located near the air outlet 108 is a blind spot indicator ("BSI") sensor 112. The BSI sensor 112 is an electrical component, and the operation of which is sensitive to build up of snow, ice, debris, and dirt. Therefore, a cover 114 is required to protect the BSI sensor 112 from outside debris that may interfere with its operation.

Due to the proximity of the air outlet 108 to a rear wheel well 116, and by extension the rear tire and road (not shown), noise and vibrations from the road may enter the passenger cabin 110 through the air outlet 108. This is particularly an issue if outside debris blocks the closing of one of the flaps 118 of the air outlet 108. Therefore, it is beneficial to include a screen 120 to act as a barrier between the air outlet 108 and noise or debris that may enter into the cavity between the white body 102 and the outer body panel 106. While the air outlet 108 is disclosed having flaps 118, the air outlet may 108 also have fixed slats or any other vent opening known to one skilled in the art.

In the embodiment illustrated in FIGS. 1-12, the cover 114 and screen 120 are integrated into a single underbody cover assembly 122. For purposes of illustration, the underbody cover assembly 122 is illustrated on the left rear quarter 104 of the motor vehicle 100. A mirror image underbody cover assembly (not shown) could be provided on the right rear quarter (not shown) of the motor vehicle 100.

The underbody cover assembly 122 is discussed in greater detail with respect to FIGS. 5-8. The underbody cover assembly 122 includes a cover 114 and a screen 120. The cover 114, which is the upper member 500 of the underbody cover assembly 122, includes a first flange 504 that extends around a circumference of an upper member 500 between the rear quarter 104 of the white body 102 and the outer body panel 106. The first flange 504 encircles a component space 506 for receiving the BSI sensor 112. The upper member 500 further includes at least one, and, in the illustrated embodiment, three mounting locations 508 for mounting the upper member 500 to the rear quarter 104 of the white body 102. The mounting locations 508 each include a semi-circular shield 510 that forms a portion of the first flange 504 and a hole in the upper member 500 for receiving a fastener 512. Any suitable fastener 512 may be used, such as bolts, screws, rivets, and the like, and the semi-circular shape of the shield 510 permits a tool to tighten the fasteners 512.

The screen 120, which is the lower member 502 of the underbody cover assembly 122, includes a screen portion 520 and a U-shaped second flange 522 that extends inwardly from the screen portion 520 to the rear quarter 104 of the white body 102.

Figure 4:
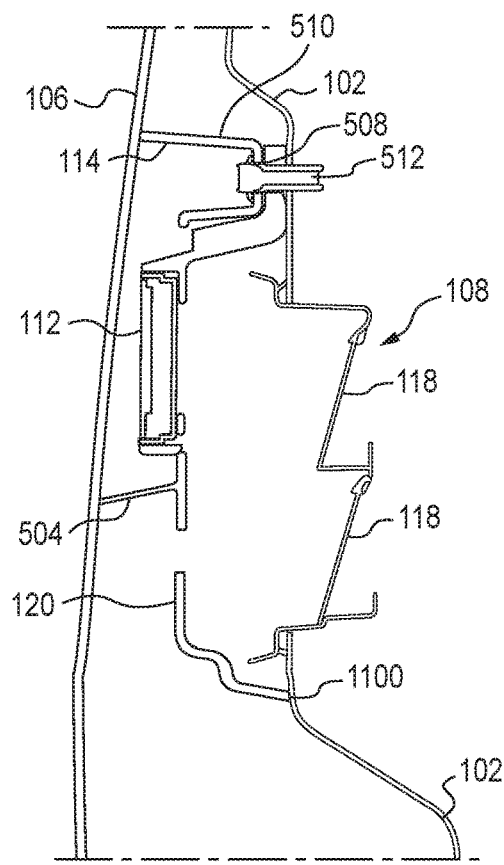
FIG. 4 is a cross-sectional view along line A-A of FIG. 1.
Figure 5:
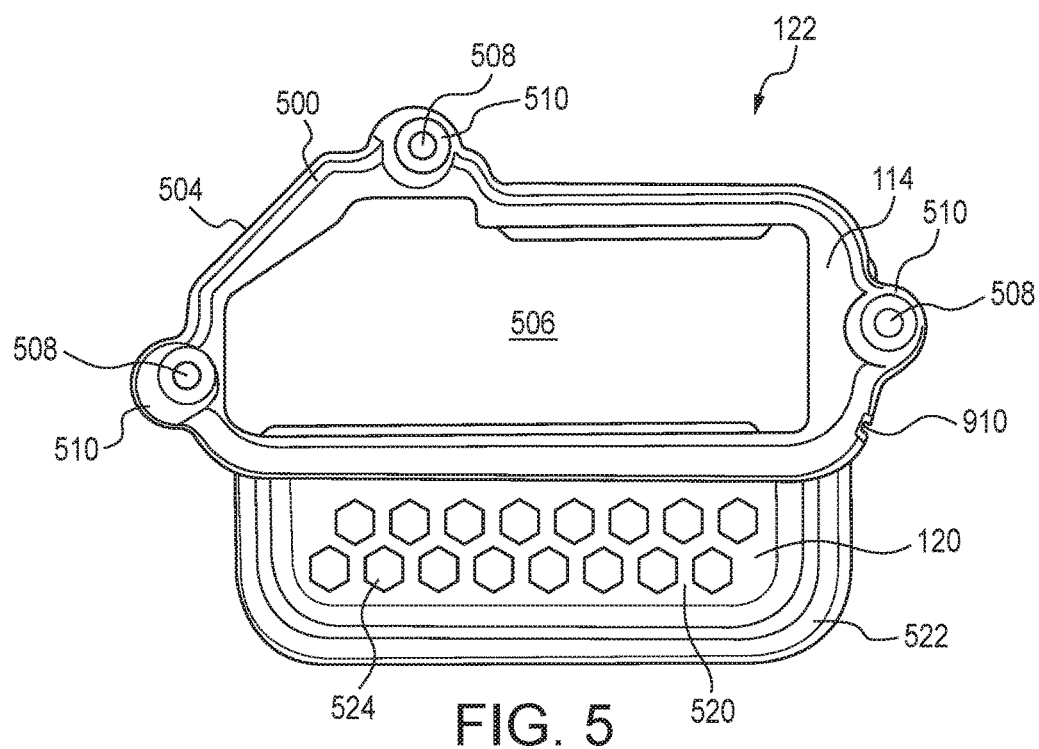
FIG. 5 is a front view of an embodiment of an underbody cover assembly.
Figure 6:
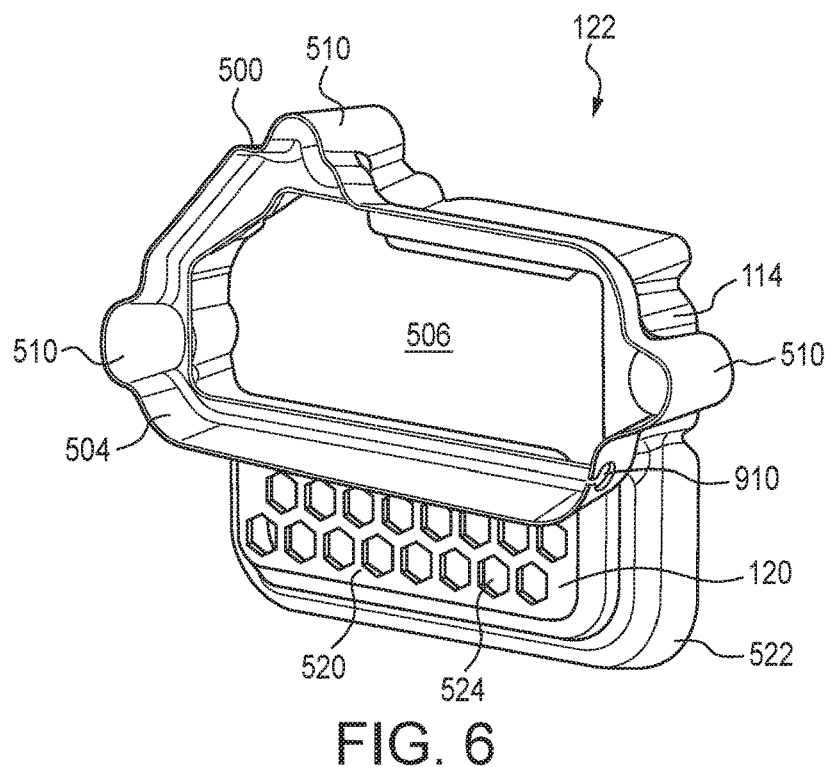
FIG. 6 is a front perspective view of the underbody cover assembly of FIG. 5.
Figure 7:
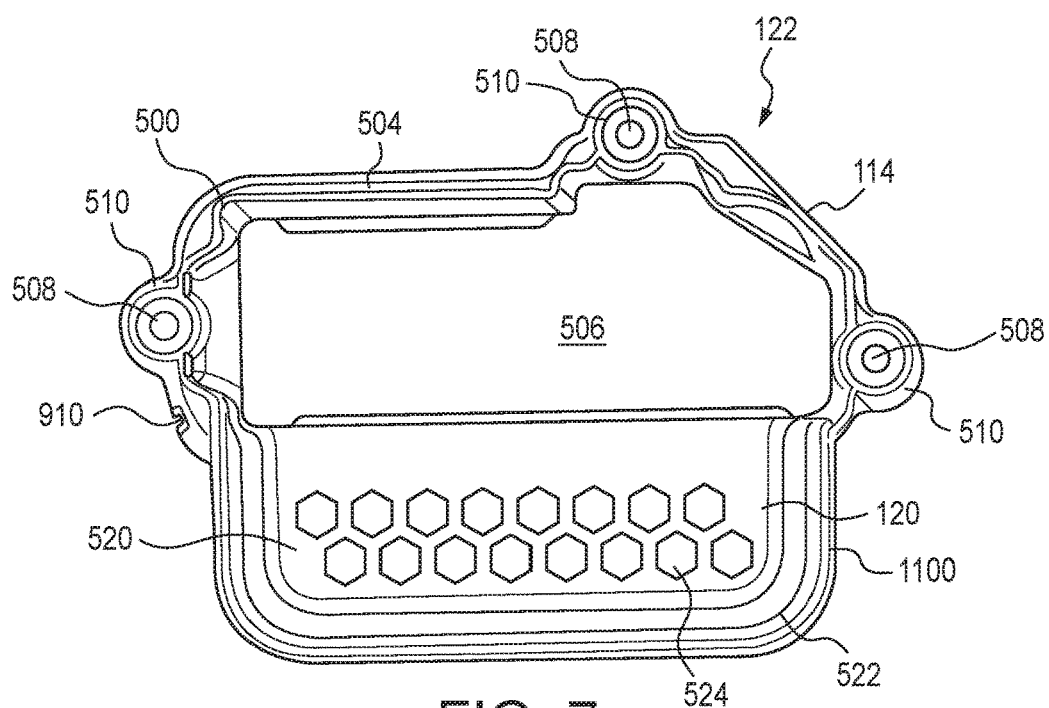
FIG. 7 is a rear view of the underbody cover assembly of FIG. 5.
Figure 8:
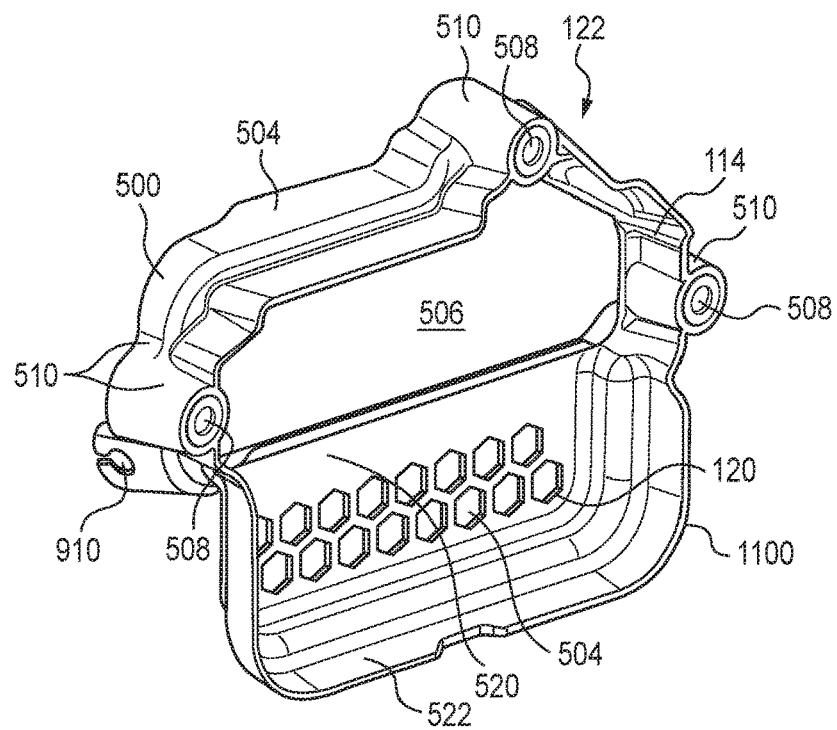
FIG. 8 is a rear perspective view of the underbody cover assembly of FIG. 5.
Figure 9:
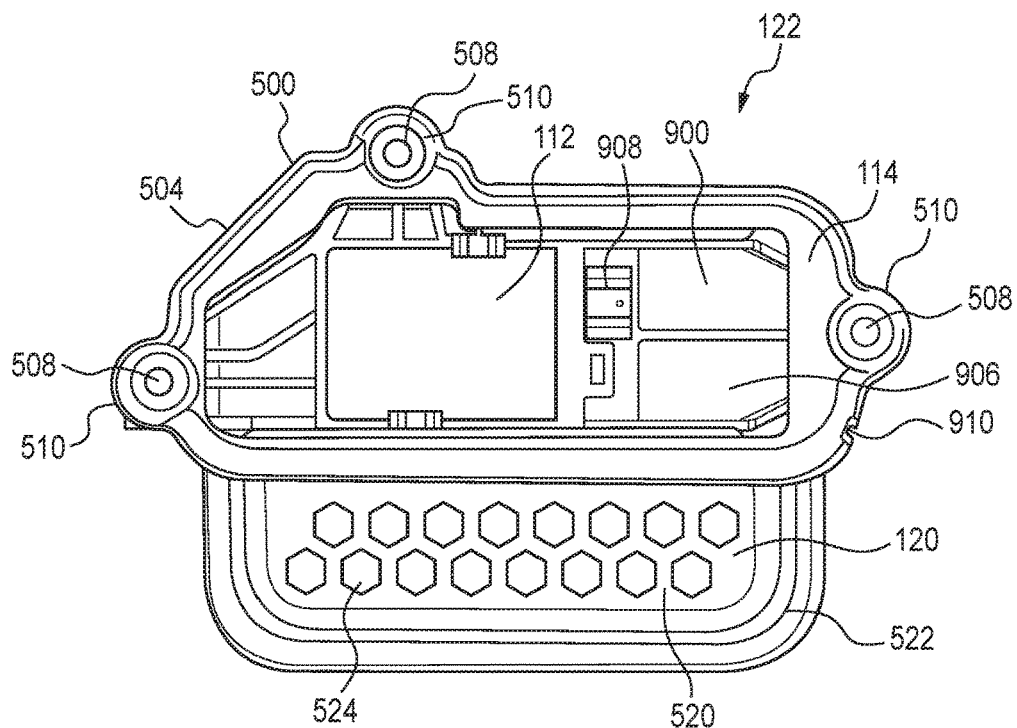
FIG. 9 is a front view of an embodiment of an underbody cover assembly with an installed blind spot indicator sensor.
Figure 10:
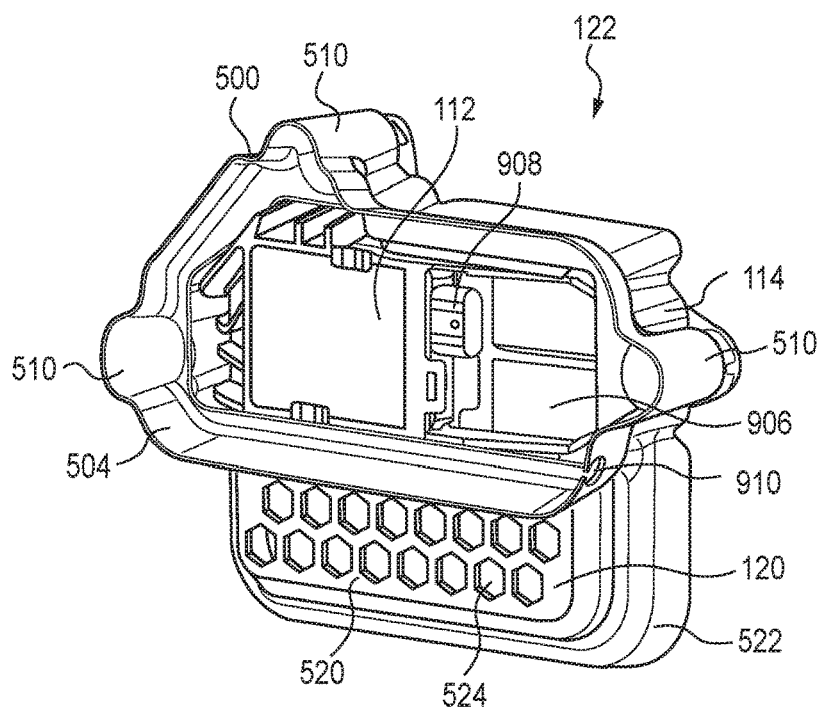
FIG. 10 is a front perspective view of the underbody cover assembly of FIG. 9.
Figure 11:
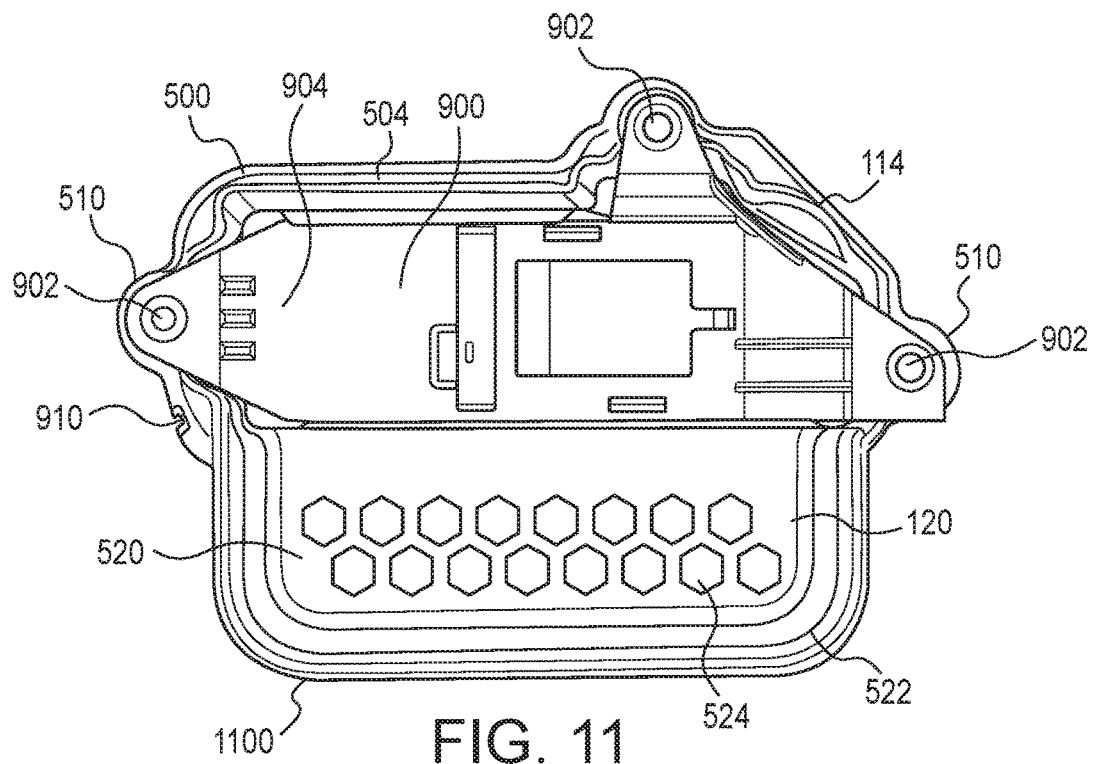
FIG. 11 is a rear view of the underbody cover assembly of FIG. 9.
Figure 12:
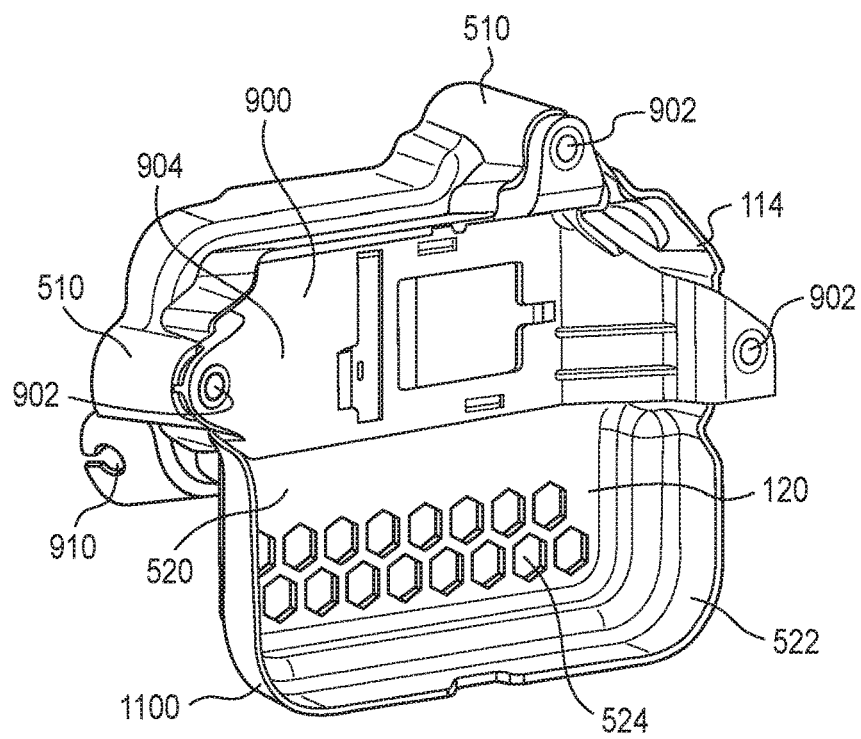
FIG. 12 is a rear perspective view of the underbody cover assembly of FIG. 9.

The first flange 504 operates to prevent debris, such as snow, ice, or dirt, from coming into contact the BSI sensor 112 or entering the component space 506 as illustrated in FIG. 4. The second flange 522 blocks debris or noise from entering the air outlet 108. Air is able to flow through apertures 524 in the screen portion 520 so the underbody cover assembly 122 does not negatively affect operation of the air outlet 108. As illustrated in the figures, the apertures 524 may be hexagonally shaped, or the apertures may be formed in any other suitable shape.

FIGS. 9-12 illustrate a co-mounted BSI carrier plate 900 that is mounted between the upper member 500 to the rear quarter 104 of the white body 102. The BSI sensor 112 is mounted to the BSI carrier plate 900. The BSI carrier plate 900 has at least one, and, in the illustrated embodiment, three mounting holes 902 aligned with the mounting locations 508 of the upper member 500 for mounting the BSI carrier plate 900 between the upper member 500 and the rear quarter 104 of the white body 102. A rear side 904 of the BSI carrier plate 900 is mounted against the rear quarter 104 of the white body 102, and the BSI sensor 112 is mounted to a front side 906 of the BSI carrier plate 900. When installed, the BSI sensor is located within the component space 506.

The BSI sensor 112 may also include or an interface 908, such as a plug, for receiving a wire (not shown) for electrical connection to the electrical system of the motor vehicle 100. The first flange 504 may include a wire aperture 910 to allow a wire to pass through the flange 504 to access the BSI sensor 112 from outside of the underbody cover assembly 122.

A seal 1100 may also be seated along a distal edge of the second flange to provide a seal where the underbody cover assembly 122 contacts the rear quarter 104 of the white body 102. The seal 1100 may improve the contact of the lower member 502 with the white body 102 due to the mounting locations 508 being located along the upper member 500.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An underbody cover assembly, comprising:
   an upper member having a first flange extending around a circumference of the upper member defining a component space and at least one mounting location having a hole for receiving a fastener there through; and
   a lower member connected to the upper member having a second flange extending inwardly around a circumference of the lower member, the lower member having a screen for blocking debris.

2. The underbody cover assembly of claim 1 wherein the upper member comprises a wire aperture for threading a wire there through.

3. The underbody cover assembly of claim 2 wherein the upper member is co-mounted to a body component with a component carrier.

4. The underbody cover assembly of claim 3 wherein a component mounted on the component carrier is disposed within the component space.

5. The underbody cover assembly of claim 4 wherein the component is a sensor.

6. The underbody cover assembly of claim 5 wherein the sensor is a blind spot indicator sensor.

7. The underbody cover assembly of claim 1 wherein the second flange is U-shaped.

8. The underbody cover assembly of claim 7 wherein the screen comprises:
   a plurality of apertures permitting air to freely flow through screen.

9. The underbody cover assembly of claim 8 further comprising:
   a seal disposed on a distal edge of the second flange.

10. The underbody cover assembly of claim 9 wherein the lower member covers an air outlet.

11. A motor vehicle, comprising:
    an inner body member;
    an outer body member disposed on an outer side of the inner body member;
    an air outlet disposed in the inner body member for allowing air to exit a cabin of the motor vehicle; and
    an underbody cover assembly disposed between the inner body member and the outer body member, comprising:

an upper member having a first flange extending around a circumference of the upper member defining a component space and at least one mounting location having a hole for receiving a fastener there through; and a lower member connected to the upper member having a second flange extending inwardly around a circumference of the lower member, the lower member covering the air outlet and having a screen for blocking debris.

12. The underbody cover assembly of claim 11 wherein the upper member comprises a wire aperture for threading a wire there through.

13. The underbody cover assembly of claim 12 wherein the upper member is co-mounted to the inner body member with a component carrier.

14. The underbody cover assembly of claim 13 wherein a component mounted on the component carrier is disposed within the component space.

15. The underbody cover assembly of claim 14 wherein the component is a sensor.

16. The underbody cover assembly of claim 15 wherein the sensor is a blind spot indicator sensor.

17. The underbody cover assembly of claim 11 wherein the second flange is U-shaped.

18. The underbody cover assembly of claim 17 wherein the screen comprises:

a plurality of apertures permitting air to freely flow through screen.

19. The underbody cover assembly of claim 18 further comprising:

a seal disposed on a distal edge of the second flange.

20. An underbody cover assembly, comprising:

an upper member for receiving and housing a component, comprising:

a first flange extending around a circumference of the upper member defining a component space, the component being disposable in the component space; and at least one mounting location having a hole for receiving a fastener there through for mounting the upper member to a body member; and a lower member connected to the upper member for covering an air outlet, comprising:

a U-shaped second flange extending inwardly around a circumference of the lower member;

a screen with a plurality of apertures for blocking debris from entering the air outlet; and a seal disposed on a distal edge of the second flange for providing a seal between the lower member and the body member.

* * * * *